(12) United States Patent
Leverger

(10) Patent No.: US 6,196,756 B1
(45) Date of Patent: Mar. 6, 2001

(54) RELEASABLE FASTENER ASSEMBLY FOR PREFERRED USE IN A VEHICLE

(75) Inventor: Eric Leverger, Epone (FR)

(73) Assignee: Illinois Tool Works Inc., Glenview, IL (US)

(*) Notice: Subject to any disclaimer, the term of this patent is extended or adjusted under 35 U.S.C. 154(b) by 0 days.

(21) Appl. No.: 09/046,567

(22) Filed: Mar. 24, 1998

(30) Foreign Application Priority Data

Mar. 24, 1997 (FR) .................................................. 97 03544

(51) Int. Cl.$^7$ ...................................................... F16B 13/04
(52) U.S. Cl. ........................ 403/326; 403/408.1; 411/41; 411/48; 411/45
(58) Field of Search ........................ 403/315, 320, 403/326, 328, 408.1; 411/41, 46, 48, 349, 549, 45

(56) References Cited

U.S. PATENT DOCUMENTS

| | | | |
|---|---|---|---|
| 4,674,930 | * 6/1987 | Poe et al. ........................... | 411/41 X |
| 5,211,519 | 5/1993 | Saito . | |
| 5,375,954 | 12/1994 | Eguchi . | |
| 5,499,854 | * 3/1996 | Crotty, III et al. ................ | 411/48 X |
| 5,560,575 | * 10/1996 | Krysiak ............................. | 411/41 X |
| 5,560,669 | * 10/1996 | Gite .................................. | 411/45 X |
| 5,567,098 | * 10/1996 | Gordon ............................. | 411/48 |
| 5,641,255 | * 6/1997 | Tanaka ............................. | 411/48 |
| 5,775,860 | * 7/1998 | Meyer ............................... | 411/41 X |
| 5,868,370 | * 2/1999 | Nivet ................................ | 411/41 X |

FOREIGN PATENT DOCUMENTS

| | | |
|---|---|---|
| 195 11 580 A1 | 10/1995 | (DE) . |
| 0 691 230 A1 | 1/1996 | (EP) . |
| 1270540 | 6/1969 | (GB) . |

* cited by examiner

Primary Examiner—Lynne H. Browne
Assistant Examiner—David E. Bochna
(74) Attorney, Agent, or Firm—Lowe Hauptman Gilman & Berner

(57) ABSTRACT

The article includes a first piece (7) provided with two flexible lugs adopting, in the absence of any force, a position of rest in which they can, over a certain length, be inserted without effort into an opening (6) in a support (1), and a second piece (30) having a fixing foot (32) adapted to cooperate with the first piece so that the fixing foot can be inserted through the first piece (7) as far as a configuration of locking on the support in which the fixing foot (32) keeps the flexible lugs on the first piece (7) separated and in which the first and second pieces (7, 30) are snapped into each other.

9 Claims, 6 Drawing Sheets

RELEASABLE FASTENER ASSEMBLY FOR PREFERRED USE IN A VEHICLE

TECHNICAL FIELD

The invention relates to fasteners and, more particularly, to fasteners that can be installed without tools.

BACKGROUND ART

Releasable fastener assemblies are commonly used in vehicles, such as automobiles, by insertion into a blind hole formed in the vehicle cabin above the windshield to receive, for example, a sun visor. It would be desirable for such releasable fastener assemblies to be easily installed by an operator on a vehicle assembly line without the need of installation tools or significant muscular effort.

SUMMARY OF THE INVENTION

The present invention aims to enable an operator to fix the article, notably on a vehicle assembly line, without a tool and with moderate effort, that is to say with an effort which does not give rise to any particular muscular fatigue.

To this end the invention proposes an article to be fixed blind on a support provided with an opening of predetermined contour, characterised in that the article comprises:

a) a first piece having:
  i) two flexible lugs disposed, in the absence of any force, in a predetermined rest position, over a predetermined length as measured from their free ends for insertion without effort into the opening in the support, and being movable from the rest position into, a position of locking on the support,
  ii) a stop for bearing against the support when the flexible lugs have been inserted into the opening in the support to their predetermined length, and
  iii) a body to which the flexible lugs are connected at a second end, thereof, the body being provided with an opening of predetermined contour opening out between the flexible lugs; and
b) a second piece having:
  i) a fixing foot adapted to cooperate with the first piece so that the fixing foot can be inserted, from a free end thereof, through the opening in the body of the first piece, so that the article to be fixed affords a configuration of locking on the support in which the fixing foot keeps the flexible lugs of the first piece separated in the locking position,
  ii) snapping-in means to hold the second piece on the first piece when the article to be fixed is in the locking configuration on the support, and
  iii) an element to which the fixing foot is connected at a second end thereof.

In practice, the useful portion of the article to be fixed is this element which forms a part of the second piece (e.g., a vehicle sun-visor hook).

To fix the article, the operator inserts the flexible lugs on the first piece into the opening in the support until the stop on the first piece bears on the support. The operator then pushes the fixing foot on the second piece into the opening in the body of the first piece until it reaches the locking configuration in which the first piece is held on the support by virtue of the fact that the flexible lugs are kept separated, and in which the second piece is held on the first piece by virtue of the snapping-in means.

It can be seen that the article is fitted on the support by a simple movement of pushing the first piece onto the support and then the second piece into the second piece, and that only the operation of inserting the fixing foot on the second piece into the first piece requires an effort.

Because the first piece does not snap onto the support before the second piece is pushed into the first piece, the force required to effect this insertion can be particularly moderate.

According to preferred characteristics, for practical design reasons:

each flexible lug has, on the external side, a surface inclined towards the outside and towards its free end, in order to be engaged with the periphery of the opening in the support when the flexible lugs are separated from each other after having been inserted into the opening in the support over the predetermined length; and the snapping-in means, which the second piece has in order to be held on the first piece when the article to be fixed is in the configuration of locking on the support, has teeth disposed at the end of the fixing foot, on the external side, adapted to be located beyond the fixing lugs when the article is in the locking configuration, and each having a stop surface coming opposite to the free end of a respective one of the said flexible lugs.

According to other preferred characteristics, the first and second pieces have means for being held on each other in a waiting configuration in which the fixing foot on the second piece is partially inserted through the opening in the first piece, and in which the flexible lugs on the first piece are in the position of rest.

Mounting the article on the support is thus particularly simple, since it suffices for the operator to grip it by the element on the second piece, and then to effect an overall pushing-in movement in which the first piece is first of all positioned opposite the support, and then the second piece is pushed into the first piece as far as the locking configuration.

Preferably, for reasons of ease of production, the means for holding the article in the idle configuration include:

on the first piece, flexible blades extending from the body on the same side as the flexible lugs, respectively on each side of the opening, each flexible blade being provided on the inside with a tooth situated close to the body; and on the second piece, two notches disposed on each side of the fixing foot, close to its free end, in order to receive the teeth of the flexible blades.

According to other preferred characteristics, the first and second pieces are adapted to cooperate so that, from the locking configuration, the second piece can pivot coaxially with respect to the first piece, as far as an unlocking configuration in which the fixing foot on the second piece allows the flexible lugs to move closer to each other as far as the idle position.

Thus, if it proves useful for the operator to remove the article, he can do so in a similar fashion to its mounting, that is to say without a tool and without effort.

Preferably, for practical design reasons:

the first piece has, on each flexible lug, on the inner side, a cam extending over a predetermined length from the free end;

the second piece has a fixing foot having, over a predetermined length as from its free end, a part having roughly an H cross section with a web and two flanges, the external surfaces of the flanges being adapted to cooperate with the cams in order to keep the flexible lugs separated in the locking configuration, each space delimited by the said web and the said flanges being adapted to receive a said cam in the said unlocking configuration.

The invention also relates, in a second aspect, to a vehicle provided with the article which has just been disclosed, mounted on a support forming part of this vehicle.

BRIEF DESCRIPTION OF THE DRAWINGS

The disclosure of the invention will now be continued with the description of an example embodiment, given below by way of illustration and non-limitatively, with regard to the accompanying drawings.

BEST MODE FOR CARRYING OUT THE INVENTION

Figure 1:
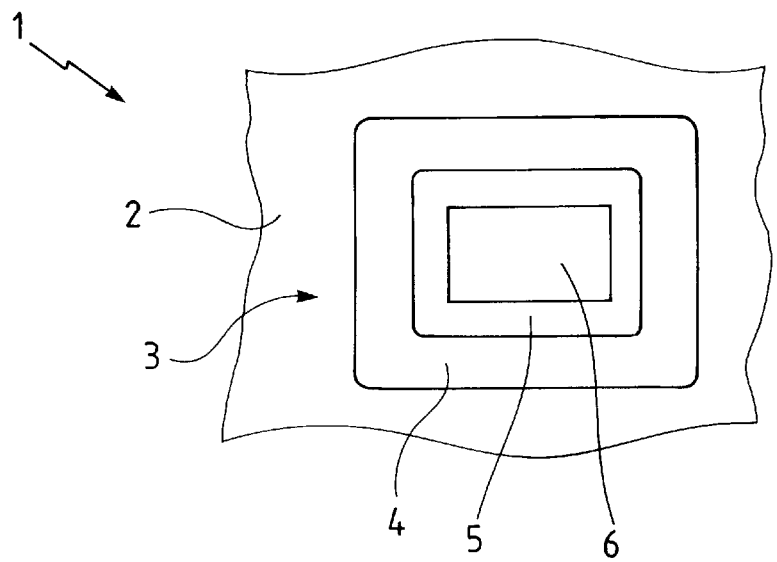
FIG. 1 is a plan view of a support on which the article according to the invention is to be fixed, this view showing the area of the support in which the mounting opening for the article is situated.

The support 1 shown partially in FIG. 1 is a profiled section forming part of the bodywork of a motor vehicle, situated above the windscreen.

Figure 5:
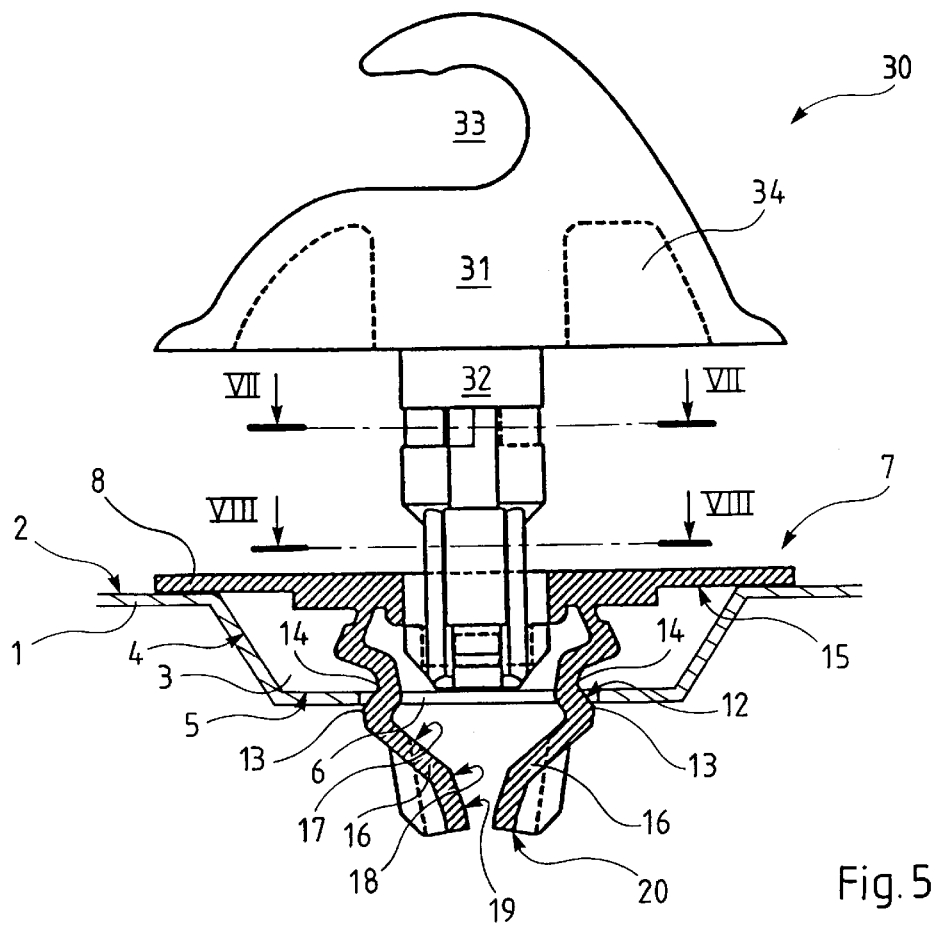
FIG. 5 is an elevation view of the article in which the two pieces are assembled in a waiting configuration, the first piece being in place on the support, and being shown in section along a longitudinal plane of symmetry.
Figure 9:
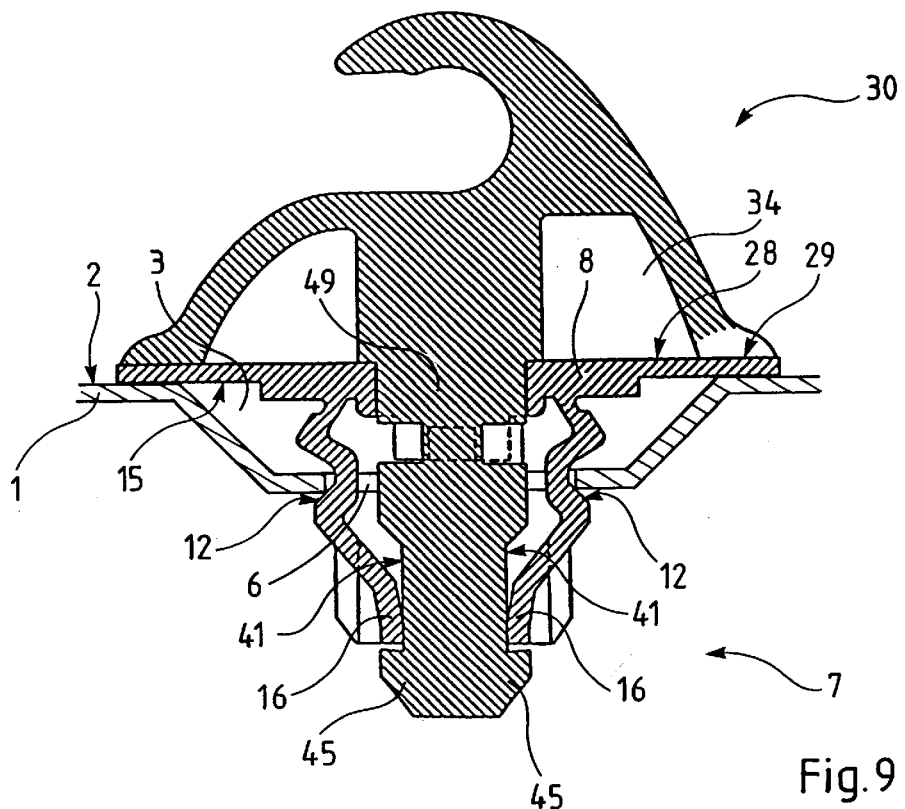
FIGS. 9 and 10 are cross-sectional elevation views, respectively along a longitudinal plane of symmetry and along a transverse plane of symmetry, showing the article in the locking configuration.
Figure 12:
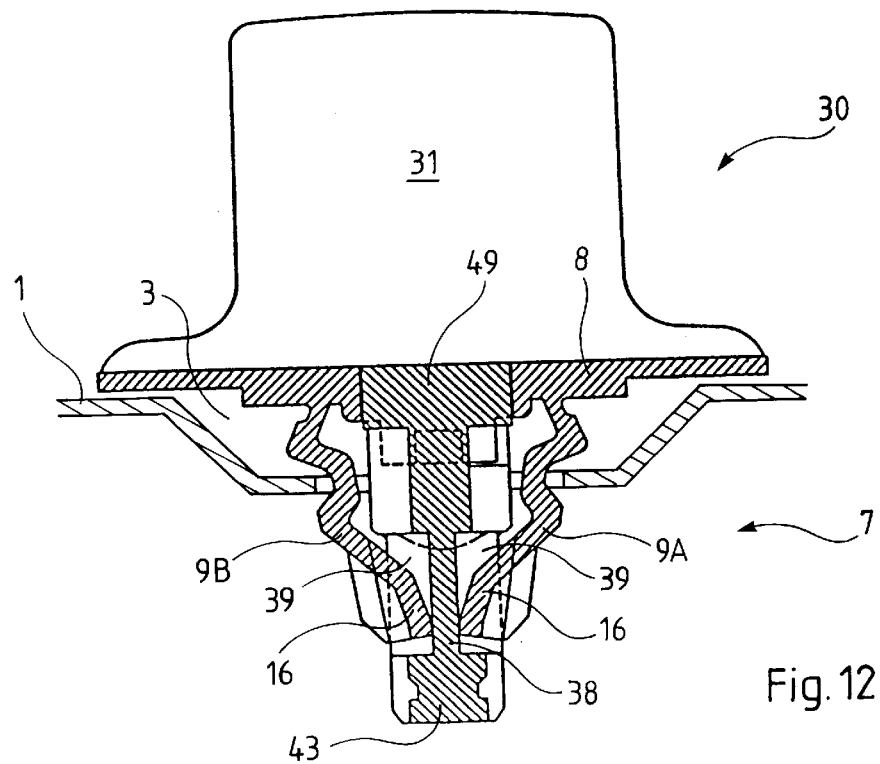
FIG. 12 is a view similar to FIG. 9, but with the second piece which has pivoted through 90° with respect to the first piece.

Support 1 has a substantially planar surface 2 connected to a recess 3 having inclined sides 4 and a substantially flat base 5, parallel to the surface 1, and in which a rectangular opening 6 is formed (see also FIGS. 5, 9 and 12).

Figure 2:
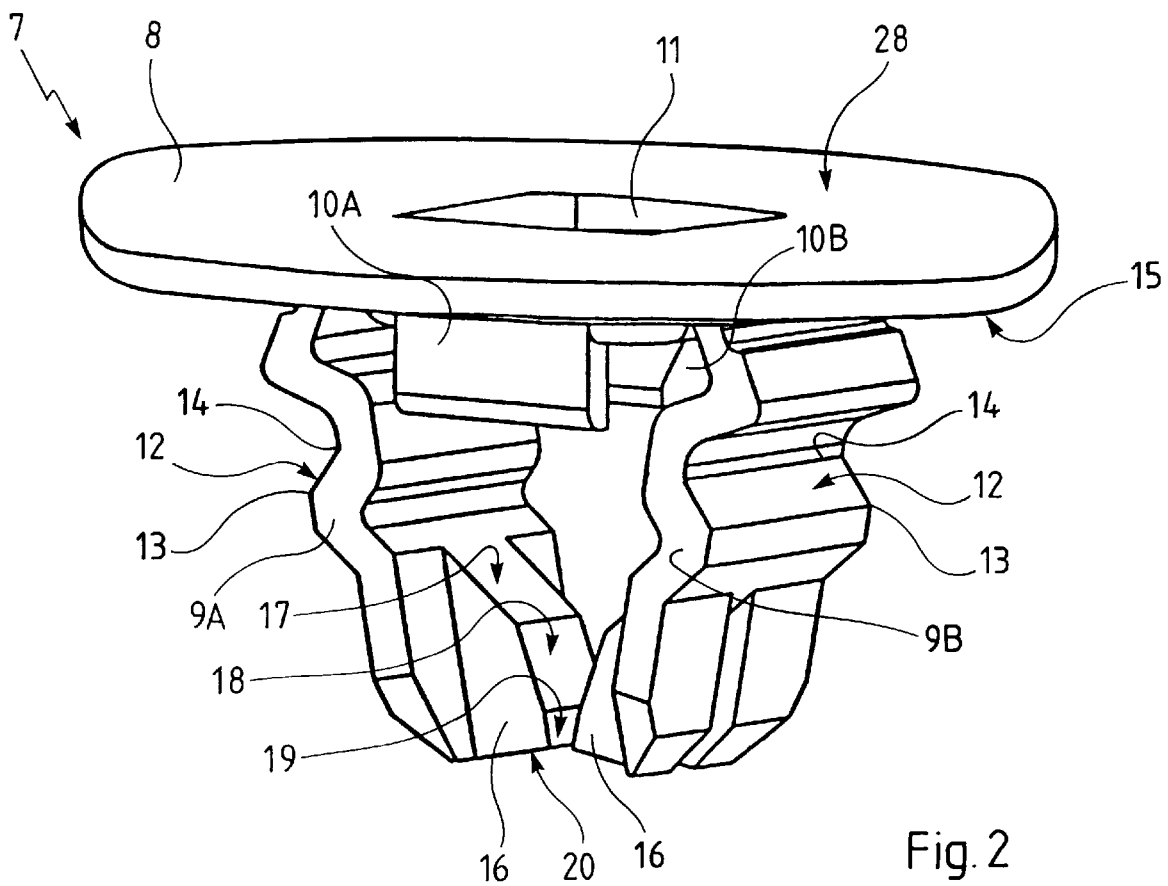
FIGS. 2 and 3 are perspective views showing respectively both of the pieces which together form the article to be fixed.

The piece 7 shown notably in FIG. 2 is produced from plastic material moulded in a single piece and has a body 8 with two flexible lugs 9A and 9B and two flexible blades 10A and 10B.

The body 8 is flat and has an external contour which is oval and sufficiently large to completely cover the recess 3. Body 8 has a central opening 11 in the shape of a square, which opens out between the lugs 9A and 9B and between the blades 10A and 10B.

The flexible lugs 9A and 9B project from the body 8 and are oriented roughly in the transverse direction of the piece 7. Lugs 9A, 9B are symmetrical (mirror image) with respect to each other.

On the external side, each of the lugs 9A and 9B has a surface 12 inclined towards it free end and towards the outside. Between the surface 12 and the free end, there is no surface oriented towards the outside. The ridge 13 delimiting the surface 12 on the same side as the free end constitutes the outermost point of the part of the external surface of the lug 9A or 9B situated between its free end and the ridge delimiting the surface 12 on the same side as the body 8.

Figure 4:
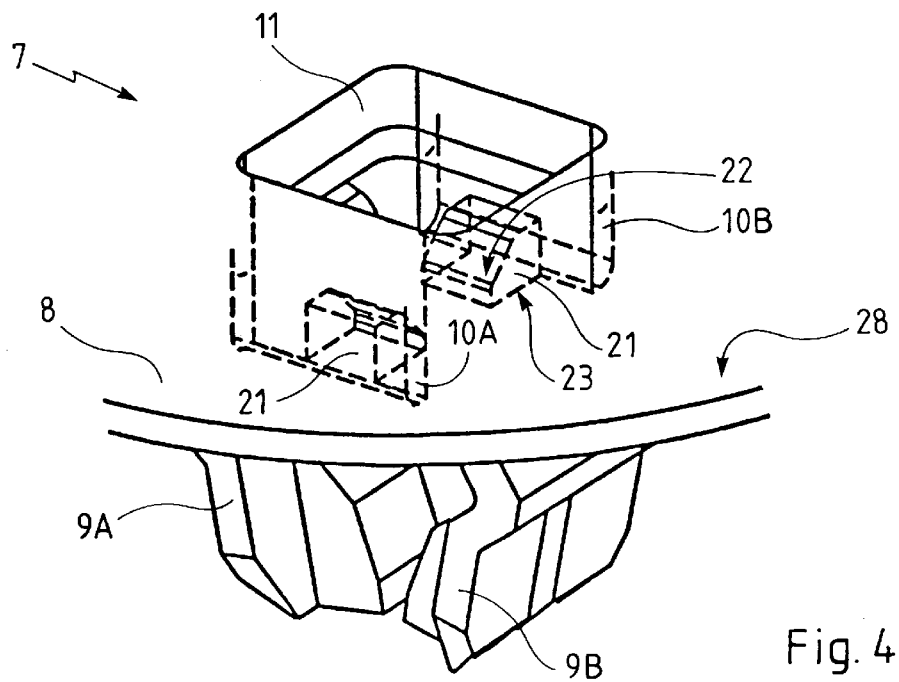
FIG. 4 is a partial perspective view of the piece illustrated in FIG. 2, taken at an angle showing the inner side of the flexible blade situated just alongside of the opening in this piece.

In the absence of any force, the lugs 9A and 9B adopt the rest position shown in FIGS. 2, 4 and 5, where the distance between the respective ridges 13 corresponds approximately to the length of the opening 6 in the support 1.

The width of the lugs 9A and 9B is constant over approximately their entire height, and corresponds substantially to the width of opening 6.

Thus, as can be seen more particularly in FIG. 5, the lugs 9A and 9B, when in the rest position, can be inserted into the opening 6 as far as the level of the surface 12 without effort.

The distance between the ridge 14 on each of the lugs 9A and 9B and the surface 15 of the body 8 situated at the periphery thereof on the same side as the lugs 9A and 9B, corresponds approximately to the depth of the recess 3 so that, when the surface 15 of the piece 7 bears on the surface 2 of the support 1, the surface 12 is situated approximately at the level of the opening 6 as shown in FIG. 5.

If the lugs 9A and 9B are then separated from each other (see FIG. 9 position), the surface 12 bears on the periphery of the opening 6, so that withdrawing the piece 7 with respect to the support 1 is impossible.

It will be observed that the cooperation between the periphery of the opening 6 and the lugs 9A and 9B by means of the surfaces 12 makes it possible to press the body 8 onto the surface 2 firmly, and to accept relatively large dimensional tolerances for the depth of the recess 3 and for the length of the opening 6.

The orientation of the external lug surfaces situated between the surface 12 and the free end facilitates the insertion into the opening 6.

The form with a cross section roughly in the shape of a horizontal V with the apex turned outwards which the lugs 9A and 9B have between the surface 12 and the body 8 facilitates the manufacture of the mould in which the piece 7 is obtained.

The connection zone between the lug 9A or the lug 9B and the body 8 has a smaller thickness than the rest of these lugs, in order to facilitate the flexing thereof around this zone.

On the inner side, each of the lugs 9A and 9B has a cam 16 extending a certain length from the free end, centred and with a smaller constant width than the width of the opening 6 in the support 1.

The surfaces 17, 18 and 19 of the cam 16, which are opposite each other, are all oriented inwards and towards the free end. A surface 20 which is recessed with respect to the surfaces 17, 18 and 19 delimits the free end of cam 16.

The flexible blades 10A and 10B extend projecting from the body 8, on the same side as the lugs 9A and 9B, and are roughly oriented in the 20 longitudinal direction of the piece 7. Blades 10A, 10B are symmetrical (mirror image) with respect to each other.

The height of each blade 10A and 10B is less than the depth of the recess 3, in which they are housed when the piece 7 is fitted on the support 1, as shown notably in FIGS. 5 and 9.

The blades 10A and 10B have approximately a constant thickness, and each carries, on the inside, a tooth 21 (see, e.g., FIG. 4) which is centered and narrower than the blades 10A and 10B.

Each tooth 21 has a surface 22 facing towards the body 8 and inclined inwards and in the opposite direction to the body 8, and a surface 23 which is recessed with respect to the surface 22.

Figure 3:
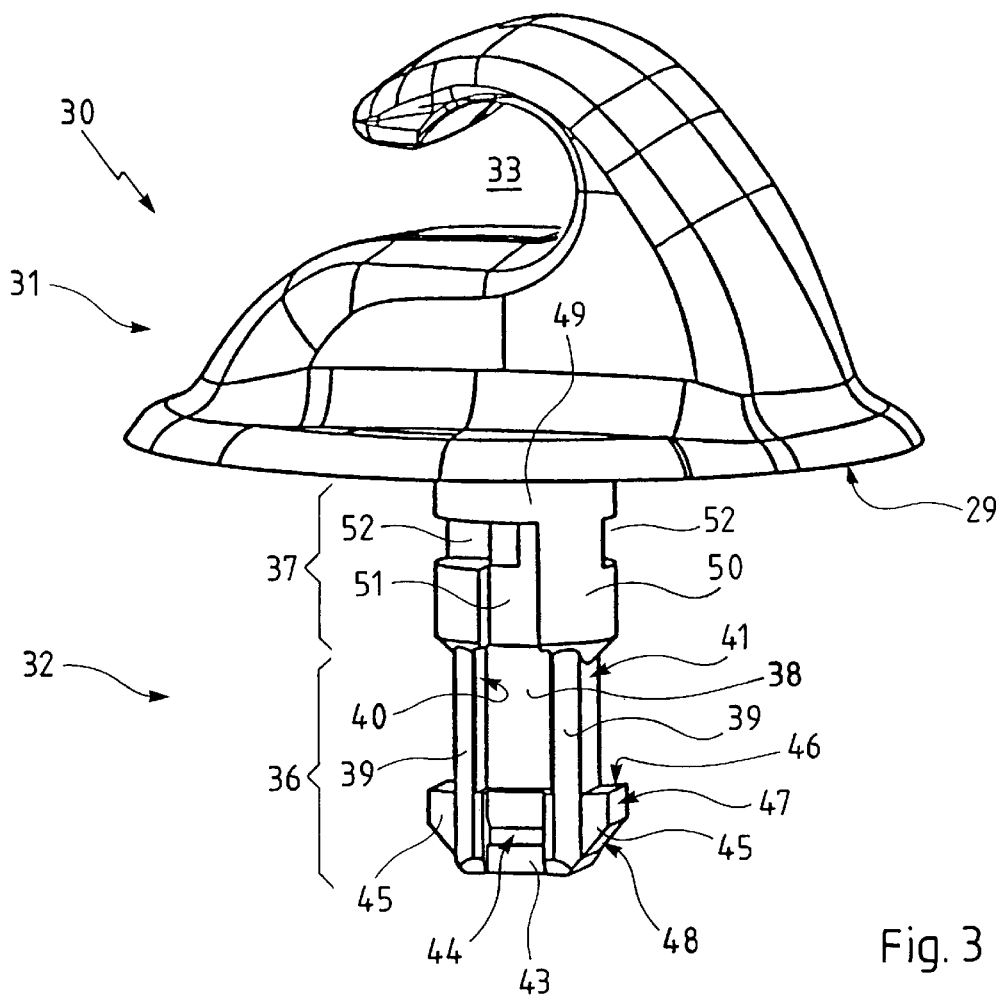

The piece 30 which constitutes the second piece of the article to be fixed, shown notably in FIG. 3, is also produced from plastic material moulded in a single piece. It includes a sun-visor hook 31 and a fixing foot 32.

The hook 31 has, on the side which can be seen at the top in the drawings, a hollow 33 designed to receive, in a well known fashion, a pivoting journal for a motor vehicle sun visor.

The base of the hook 31 is planar and has an oval external contour corresponding roughly to that of the body 8 of the piece 7.

On the side which faces towards the foot 32, the hook 31 has an annular recess 34 (see FIG. 5) for limiting the thickness of material. A cylindrical barrel is at the centre of the recess 34, and it is to the base of this barrel that the foot 32 is connected.

The foot 32 has a part 36 with a roughly H shaped cross section and a part 37 with a roughly cylindrical shape.

The overall size of the part 36 is smaller than that of the part 37. The diameter of the latter corresponds to the length of a side of the square-shaped opening 11 in the piece 7.

The part 36 extends over a certain length as from the free end of the foot 32 (bottom end in FIG. 3).

Figure 8:
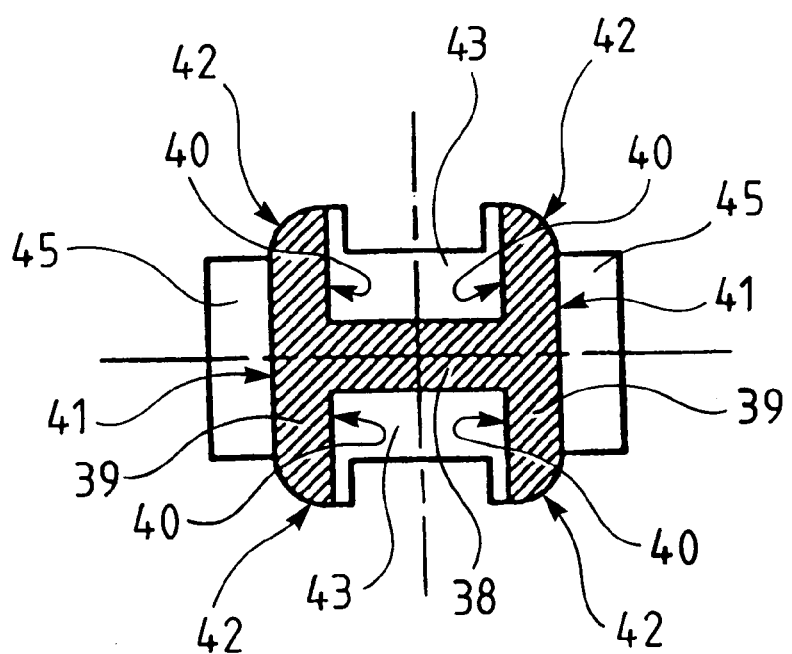

As can be seen more particularly in FIG. 8, the part 36 has a web 38 oriented along the longitudinal direction of the piece 30 and has, at each end of the web 38, a flange 39 oriented along the transverse direction of the piece 30.

The distance which separates the facing surfaces 40 of the flanges 39 is greater than the width of the teeth 21 on the blades 10A and 10B, and corresponds approximately to the width of the cams 16 on the lugs 9A and 9B.

The external surfaces 41 of the flanges 39 are parallel to the surfaces 40 and are separated by a distance such that, if the surfaces 19 of the cams 16 on the lugs 9A and 9B are separated by this distance, then the lugs 9A and 9B are sufficiently separated for their surface 12 to bear on the periphery of the opening 6 (see FIG. 9).

Each of the connections between a surface 40 and a surface 41 is effected by a rounded surface 42, having a cross section forming a quarter of a circle.

The web 38 has, as from its free end and over a certain distance, a base piece 43 whose thickness is approximately three times the remainder of the web 38, the thickness of the piece 43 being less than the width of the flanges 39.

The thickness of the web 38, in its part situated between the base piece 43 and the part 37 of the foot 32, corresponds approximately to the distance which separates the surfaces 19 of the cams 16 in the position of rest (see FIG. 12).

Figure 6:
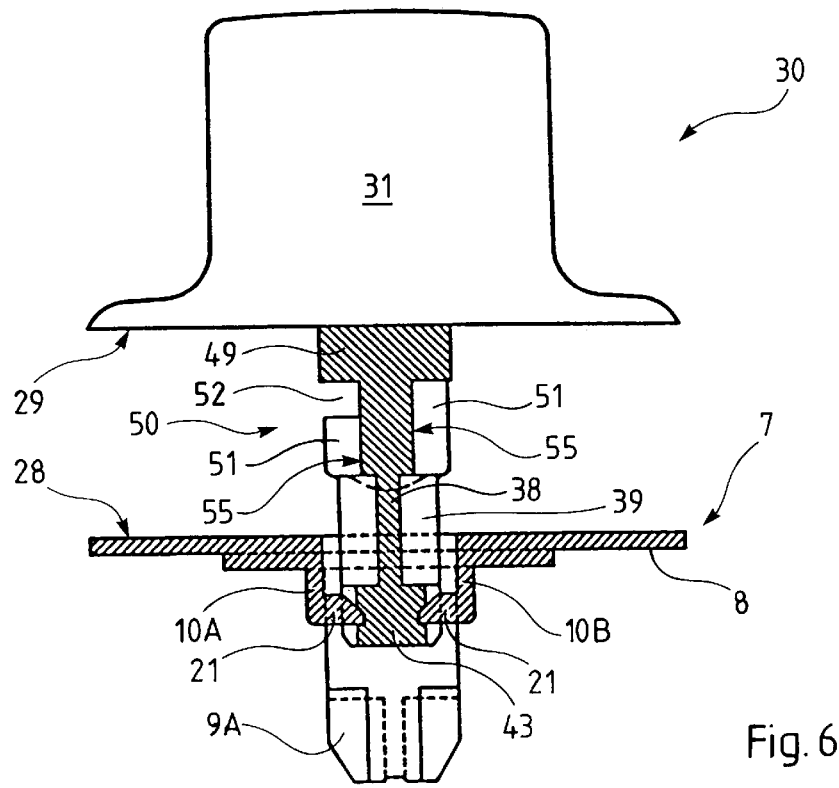
FIG. 6 is a similar view of the article in the waiting configuration, but taken in section along a transverse plane of symmetry.
Figure 10:
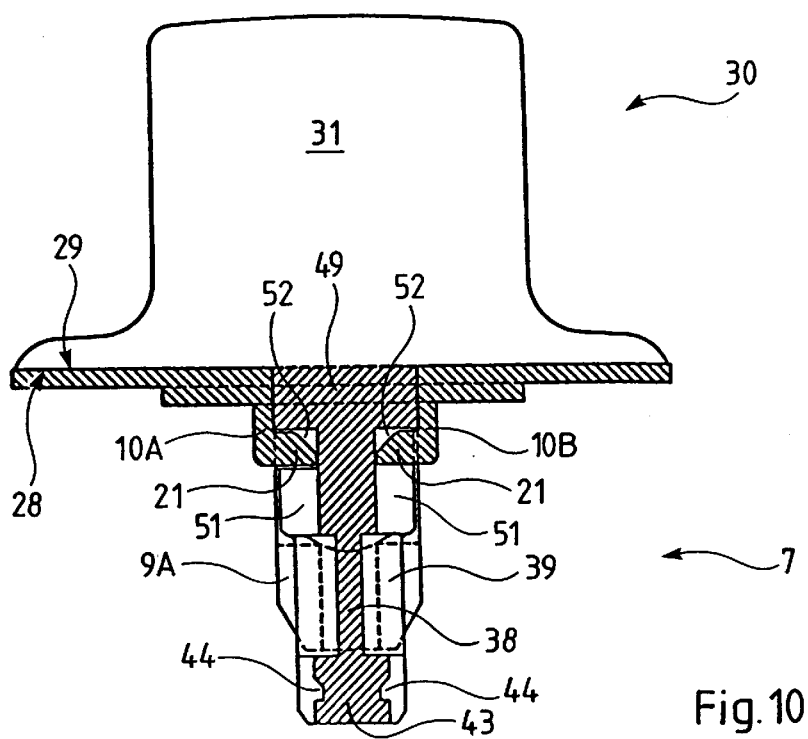

Each external surface of the base piece 43 has, approximately halfway up, a notch 44 having a profile similar to that of the free end of the teeth 21 on the blades 10A and 10B (see more particularly FIGS. 6 and 10).

On the external side of each of the flanges, the foot 32 has a tooth 45 extending as from the free end over the same distance as the base piece 43.

As can be seen more particularly in FIG. 8, the teeth 45 have a constant thickness which corresponds to that of the base piece 43.

The teeth 45 each have a surface 46 oriented parallel to and facing the surface 29 delimiting the base of the hook 31,
an external surface 47 oriented transversely to the surface 46 and a slope 48 oriented towards the free end and inwards, the base of the slope 48 being situated approximately in line with the external surface 41 of the corresponding flange 39.

The distance which separates the surfaces 47 of the respective teeth 45 is approximately equal to the length of one side of the square-shaped opening 11 in the piece 7.

The part 37 of the foot 32 has, starting from the hook 31, a length 49 with a purely cylindrical cross section and, between the length 49 and the part 36, a length 50 having a channel 51 in line with each hollow situated between the web 38 and the flanges 39 of the part 36.

Each channel 51 has a U-shaped cross section, with a width which corresponds to that of the teeth 21, and with a depth such that the bottom of the channel 51 is not at the same level as the external surfaces of the web 38, but slightly more towards the outside, approximately at the level of the bottom of the notches 44 in the base piece 43.

Just below the length 49, the part 37 has two recesses 52, oriented transversely to the channels 51, that is to say having an overall orientation parallel to the base of the hook 31.

The distance which separates the recesses 52 from the base surface 29 of the hook 31, corresponding to the distance which separates, on the piece 7, the teeth 21 from the surface 28 of the body 8 which is opposite to surface 15 (see more particularly FIGS. 6 and 10).

Figure 7:
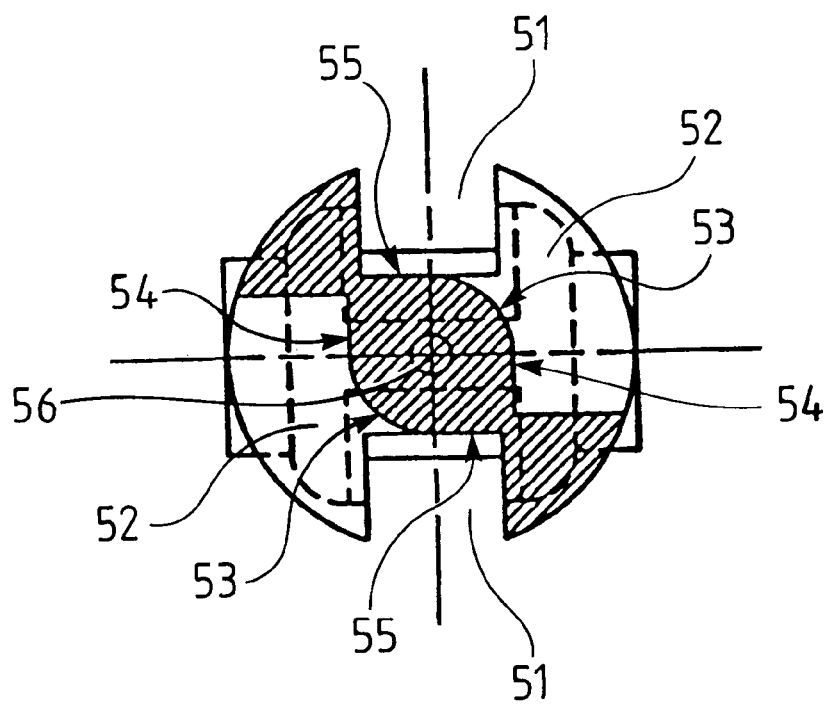
FIGS. 7 and 8 are views in cross section indicated respectively by lines VII—VII and VIII—VIII in FIG. 5.

As can be seen in FIG. 7, each of the recesses 52 has a bottom having a rounded surface 53 and a straight surface 54, oriented at 90° with respect to the bottom surface 55 of the channel 51, and situated at the same distance from the axis 56 of the piece 30. The rounded surface 53 has a cross section in the form of a quarter of a circle, the diameter of which corresponds to the distance between the axis 56 and surface 54 or the surface 55.

Thus, when each of the teeth 21 on the piece 7 is situated in a respective recess 52 in the piece 30, with the free end of each tooth 21 bearing on one of the surfaces 55, it is possible to rotate the piece 30 through 90° with respect to the piece 7, the free end of the teeth 21 passing from the surface 55 to the surface 54 by sliding on the surface 53.

Figure 11:
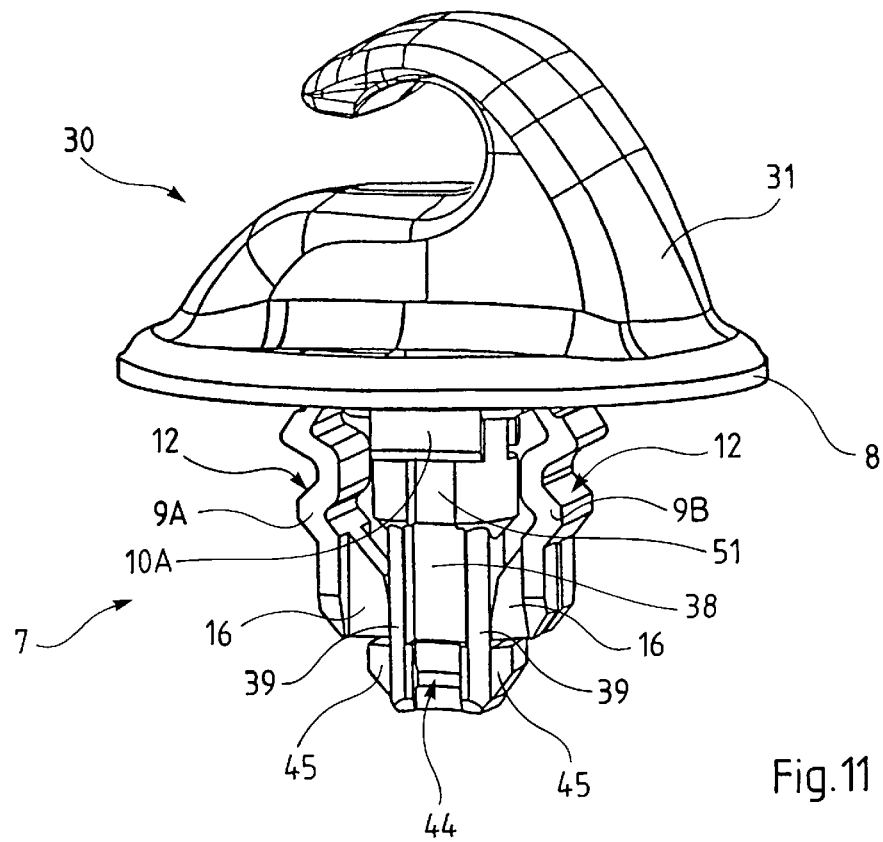
FIG. 11 is a perspective view of the article in this configuration.

The rounded surfaces 42 of the portion 36, and more precisely those which are situated at top left and bottom right in FIG. 8, also allow the rotation of the piece 30 with respect to the piece 7, the surfaces 19 of the cams 16 sliding on these surfaces 42 in order to pass from the outside of the flanges 39 to the space situated between these flanges (see notably FIGS. 11 and 12).

An explanation will now be given with respect to how the article formed by the pieces 7 and 30 is used.

After having been manufactured separately, these pieces are preassembled in the configuration shown in FIGS. 5 and 6, in which the pieces 7 and 30 are connected to each other by virtue of the fact that the teeth 21 are housed in the notches 44 in the base piece 43.

In order to reach this position, the piece 30 is offered up vis-à-vis the piece 7 with the foot 32 facing the body 8 on the same side as the surface 28, seeking to cause the longitudinal and transverse planes of symmetry of the two pieces to coincide, and the foot 32 is pushed into the opening 11. Because of the dimensions indicated previously, the foot 32 is pushed freely into the opening 11, and then the base piece 43 comes into contact on each side with a respective tooth 21, by means of the surface 22 of the tooth.

When the movement of pushing the foot 32 into the orifice 11 is continued, the cooperation between the base piece 43 and the tooth 21 causes the flexible blades 10A and 10B to separate from each other, the end of the blades 21 slides on the lateral walls of the base piece 43, and ends up by being located in a notch 44. This then gives the configuration shown in FIGS. 5 and 6 in which the pieces 7 and 30 are held on each other.

The holding afforded by the cooperation of the blades 10A and 10B provided with the teeth 21 with the base piece 43 having notches 44, offers a high-quality holding which offers good guarantees of their remaining captive.

It is in this partially assembled configuration that the article is made available to the operator, who has nothing more to do than to mount the assembly on the support 1.

It will be observed that, in the partially assembled configuration, the lugs 9A and 9B on the piece 7 are not in contact with the foot 32, and therefore remain in their position of rest.

In order to assemble the articles 7, 30 in the partially assembled configuration, the operator grips it by the hook 31 and offers it up with the flexible lugs 9A and 9B in front, aligned with the opening 6, into which he pushes them.

As explained previously, the lugs 9A and 9B pass through the opening 6 without requiring any effort on the part of the operator, and when the surfaces 12 of the respective lugs are at the level of the opening 6, the surface 15 of the body 8 comes to bear on the surface 2 of the support 1, which prevents the piece 7 from being pushed in any further.

The pushing-in force which the operator continues to exert has the effect of causing the flexible blades 10A and 10B to separate from each other, so that the teeth 21 escape from the notches 44 and the foot 32 is pushed in with respect to the piece 7. The movement continues as far as the locking configuration shown in FIGS. 9 to 11, where the base surface 29 of the hook 31 is in abutment on the surface 28 of the body 8 of the piece 7.

When passing from the partially assembled configuration (FIGS. 5 and 6) to the locking configuration (FIGS. 9 to 11), the end of the blades 21 slides first of all beyond the notches 44 on the walls of the base piece 43, then moves more or less freely vis-à-vis the web 38, and finally, when the teeth 21 engage in the respective channels 51, comes to bear on the bottom 55 of these channels, each tooth 21 being, when the article is in the locking configuration, housed in a respective recess 52.

With regard to the cooperation of the foot 32 and flexible blades 9A and 9B when passing from the partially assembled configuration to the locking configuration, contact is established only after a certain pushing-in travel, when the slopes 48 on the teeth 45 each encounter a surface 17 on a respective cam 16.

When the pushing-in movement is continued, the slopes 48 slide successively over the surfaces 17, 18 and 19, so that the lugs 9A and 9B separate from each other, then the surfaces 47 slide over the surfaces 19, which they finally move beyond, so that the blades 9A and 9B relax slightly, with the surfaces 20 coming opposite the surfaces 46 on the teeth 45.

As explained previously, the cooperation between the surfaces 12 and the edges of the opening 6 means that the piece 7 is locked vis-à-vis the support 1.

As for the piece 30, this is locked vis-à-vis the piece 7 since it can neither move in further (cooperation of the surfaces 28 and 29) nor be extracted from the piece 7 (cooperation of the cams 16 and teeth 45), nor be moved laterally (cooperation of the cylindrical portion 49 of the foot 32 with the square-shaped opening 11).

It can be seen that mounting the article formed by the pieces 7 and 30 is particularly simple and easy to perform, and that in particular it requires from the operator only a low insertion force to achieve complete assembly of the article.

If for any reason the operator wishes to disassemble the article, he only has to grip the hook 31 in order to cause the piece 30 to pivot through 90° with respect to the piece 7, in the direction in which the end of the hook which can be seen on the left in FIGS. 3, 5, 9 and 11 is drawn towards the reader.

As explained above, this rotation movement is allowed, with regard to cooperation of the foot 32 with the blades 10A and 10B, by the recesses 52.

With regard to the cooperation between the foot 32 and the blades 9A and 9B, the rotation force exerted causes the lugs 9A and 9B to separate slightly, which then slide over the external surfaces 41 of the flanges 39 and then over the rounded surfaces 42, until the cams 16 enter the space situated on each side of the web 38, between the surfaces 40, as shown in FIG. 12.

Because of the entry of the cams 16 into these spaces, the blades 9A and 9B are once again in their position of rest or approximately so, that is to say in the unlocking configuration shown in FIG. 12.

Naturally it suffices to pull on the hook 31 in order to extract the article, which has undergone no damage, from the support 1.

It can be seen that the article 7, 30 can be both assembled and disassembled without tools and with moderate effort on the part of the operator.

If the article 7, 30 is once again to be put in the partially assembled configuration, it is necessary to separate the lugs 9A and 9B and rotate the piece 30 with respect to the piece 7 in order to return the article to the locking configuration, and then separate the lugs 9A and 9B once again in order to enable the piece 30 to be moved axially vis-à-vis the piece 7, as far as the waiting position.

It will be observed that the hook 31, compared with the conventional sun-visor hooks fixed with a screw, has the advantage of not having a passage hole for the screw which influences its shape (in conventional hooks, the hole must not pass through the hollow for receiving the journal 33) and which is deleterious with regard to mechanical strength.

In a variation, not shown, the hook 31 is replaced by another element which must be mounted blind on a wall.

Numerous other variants are possible according to circumstances, notably when the article is to be fixed to a roughly flat area of the support, (without the mounting orifice being formed at the base of a recess), or where it is not useful for the article to be demountable or to afford a partially assembled configuration.

More generally, it should be stated that the invention is not limited to the examples described and depicted.

What is claimed is:

1. A fastener article adapted to be fixed blind on a support provided with an opening of predetermined contour, comprising:
 a) a first piece (7) having:
  i) two flexible lugs (9A, 9B) each structured, in the absence of any force acting thereon, over a predetermined length as measured from a free end thereof, to be inserted without effort into the opening (6) in the support (1), each lug being moveable in the opening into a position of locking on the support (1),
  ii) a stop (15) for bearing against the support (1) when the predetermined length of said flexible lugs (9A, 9B) have been inserted into the opening (6), and iii) a body (8) to which the flexible lugs (9A, 9B) are connected, said body including a body opening (11) of predetermined contour that opens out between the flexible lugs (9A, 9B); and b) a second piece (30) having:
i) a fixing foot (32) adapted to cooperate with the first piece (7) so that the fixing foot (32) can be inserted, from a free end thereof, through the body opening (11) whereby the article to be fixed (7, 30) is locked into the opening in the support as a result of the fixing foot (32) spreading the flexible lugs (9A, 9B) into a locking position with the support opening,
ii) a snapping-in arrangement (45) located on the fixing foot to contact the lugs and thereby hold the second piece (30) on the first piece (7) when the article to be fixed is in the configuration of the locking position on the support, and
iii) an element (31) to which the fixing foot (32) is connected by a second end, wherein each flexible lug (9A, 9B) has, on an external side thereof, a surface (12) inclined towards the outside and towards its free end to be engaged with the periphery of the opening (6) in the support (1) when the flexible lugs (9A, 9B) are separated from each other after having been inserted into the opening (6) in the support over the said predetermined length.

2. Article according to claim 1, wherein the said first and second pieces (7, 30) are formed with respective projections (10A, 10B, 44) adapted to engage each other in a waiting configuration in which the fixing foot on the second piece (30) is partially inserted through the body opening (11) in the first piece (7), wherein the flexible lugs (9A, 9B) on the first piece (7) are in a position of rest.

3. A fastener article adapted to be fixed blind on a support provided with an opening of predetermined contour, comprising:

a) a first piece (7) having:
i) two flexible lugs (9A, 9B) each structured, in the absence of any force acting thereon, over a predetermined length as measured from a free end thereof, to be inserted without effort into the opening (6) in the support (1), each lug being moveable in the opening into a position of locking on the support (1),
ii) a stop (15) for bearing against the support (1) when the predetermined length of said flexible lugs (9A, 9B) have been inserted into the opening (6), and
iii) a body (8) to which the flexible lugs (9A, 9B) are connected, said body including a body opening (11) of predetermined contour that opens out between the flexible lugs (9A, 9B); and b) a second piece (30) having:
i) a fixing foot (32) adapted to cooperate with the first piece (7) so that the fixing foot (32) can be inserted, from a free end thereof, through the body opening (11) whereby the article to be fixed (7, 30) is locked into the opening in the support as a result of the fixing foot (32) spreading the flexible lugs (9A, 9B) into a locking position with the support opening,
ii) a snapping-in arrangement (45) located on the fixing foot to contact the lugs and thereby hold the second piece (30) on the first piece (7) when the article to be fixed is in the configuration of the locking position on the support, and
iii) an element (31) to which the fixing foot (32) is connected by a second end, wherein in the said snapping-in arrangement, which the second piece (30) has in order to be held on the first piece (7) when the article to be fixed is in the configuration of locking on the support, includes teeth (45) disposed at the end of the fixing foot, on the external side, adapted to be located beyond the fixing lugs (9A, 9B) when the article is in the locking position, and each having a stop surface (46) coming opposite the free end of a respective one of the said flexible lugs (9A, 9B).

4. A fastener article adapted to be fixed blind on a support provided with an opening of predetermined contour, comprising:

a) a first piece (7) having:
i) two flexible lugs (9A, 9B) each structured, in the absence of any force acting thereon, over a predetermined length as measured from a free end thereof, to be inserted without effort into the opening (6) in the support (1), each lug being moveable in the opening into a position of locking on the support (1),
ii) a stop (15) for bearing against the support (1) when the predetermined length of said flexible lugs (9A, 9B) have been inserted into the opening (6), and
iii) a body (8) to which the flexible lugs (9A, 9B) are connected, said body including a body opening (11) of predetermined contour that opens out between the flexible lugs (9A, 9B); and b) a second piece (30) having:
i) a fixing foot (32) adapted to cooperate with the first piece (7) so that the fixing foot (32) can be inserted, from a free end thereof, through the body opening (11) whereby the article to be fixed (7, 30) is locked into the opening in the support as a result of the fixing foot (32) maintaining the flexible lugs (9A, 9B) into a locking position with the support opening,
ii) a snapping-in arrangement (45) located on the fixing foot to contact the lugs and thereby hold the second piece (30) on the first piece (7) when the article to be fixed is in the configuration of the locking position on the support, and
iii) an element (31) to which the fixing foot (32) is connected by a second end, wherein the said first and second pieces (7, 30) are formed with respective projections (10A, 10B, 44) adapted to engage each other in a waiting configuration in which the fixing foot on the second piece (30) is partially inserted through the body opening (11) in the first piece (7), and wherein the flexible lugs (9A, 9B) on the first piece (7) are in a position of rest, and wherein the projections include:

on the first piece (7), flexible blades (10A, 10B) extending from the body (8) on the same side as the flexible lugs (9A, 9B), respectively on each side of the body opening (11), each flexible blade (10A, 10B) being provided on the inside with a tooth (21) situated close to the body (8); and on the second piece (30), two notches (44) disposed on each side of the fixing foot (32), close to its free end, in order to receive the teeth (21) of the flexible blades (10A, 10B).

5. A fastener article adapted to be fixed blind on a support provided with an opening of predetermined contour, comprising:

a) a first piece (7) having:
i) two flexible lugs (9A, 9B) each structured, in the absence of any force acting thereon, over a predetermined length as measured from a free end thereof, to be inserted without effort into the opening (6) in the support (1), each lug being moveable in the opening into a position of locking on the support (1), ii) a stop (15) for bearing against the support (1) when the predetermined length of said flexible lugs (9A, 9B) have been inserted into the opening (6), and iii) a body (8) to which the flexible lugs (9A, 9B) are connected, said body including a body opening (11) of predetermined contour that opens out between the flexible lugs (9A. 9B); and b) a second piece (30) having:

i) a fixing foot (32) adapted to cooperate with the first piece (7) so that the fixing foot (32) can be inserted, from a free end thereof, through the body opening (11) whereby the article to be fixed (7, 30) is locked into the opening in the support as a result of the fixing foot (32) spreading the flexible lugs (9A, 9B) into a locking position with the support opening, ii) a snapping-in arrangement (45) located on the fixing foot to contact the lugs and thereby hold the second piece (30) on the first piece (7) when the article to be fixed is in the configuration of the locking position on the support, and iii) an element (31) to which the fixing foot (32) is connected by a second end, wherein the said first and second pieces (7, 30) are adapted to cooperate so that, from the locking position, the second piece (30) can pivot coaxially with respect to the first piece (7), into an unlocking configuration in which the fixing foot (32) on the second piece (30) allows the flexible lugs (9A, 9B) to move closer to each other to a rest position.

6. A fastener article adapted to be fixed blind on a support provided with an opening of predetermined contour, comprising:

a) a first piece (7) having:

i) two flexible lugs (9A, 9B) each structured, in the absence of any force acting thereon, over a predetermined length as measured from a free end thereof, to be inserted without effort into the opening (6) in the support (1), each lug being moveable in the opening into a position of locking on the support (1), ii) a stop (15) for bearing against the support (1) when the predetermined length of said flexible lugs (9A, 9B) have been inserted into the opening (6), and iii) a body (8) to which the flexible lugs (9A, 9B) are connected, said body including a body opening (11) of predetermined contour that opens out between the flexible lugs (9A, 9B); and b) a second piece (30) having:

i) a fixing foot (32) adapted to cooperate with the first piece (7) so that the fixing foot (32) can be inserted, from a free end thereof, through the body opening (11) whereby the article to be fixed (7, 30) is locked into the opening in the support as a result of the fixing foot (32) maintaining the flexible lugs (9A, 9B) into a locking position with the support opening, ii) a snapping-in arrangement (45) located on the fixing foot to contact the lugs and thereby hold the second piece (30) on the first piece (7) when the article to be fixed is in the configuration of the locking position on the support, and iii) an element (31) to which the fixing foot (32) is connected by a second end, wherein the said first and second pieces (7, 30) are adapted to cooperate so that, from the locking position, the second piece (30) can pivot coaxially with respect to the first piece (7), into an unlocking configuration in which the fixing foot (32) on the second piece (30) allows the flexible lugs (9A, 9B) to move closer to each other to a rest position and wherein:

the first piece (7) has, on each flexible lug (9A, 9B), on the inner side, a cam (16) extending over a predetermined length from the free end;

the second piece (30) has a fixing foot having, over a predetermined length as from its free end, a part (36) having roughly an H cross section with a web (38) and two flanges (39), the external surfaces (41) of the flanges (39) being adapted to cooperate with the cams (16) in order to keep the flexible lugs (9A, 9B) separated in the locking configuration, each space delimited by the said web (38) and the said flanges (39) being adapted to receive a said cam (16) in the said unlocking configuration.

7. Article according to claim 6, wherein a round surface (42) is provided between the internal and external surfaces (40, 41) of the said flanges (39).

8. A fastener article adapted to be fixed blind on a support provided with an opening of predetermined contour, comprising:

a) a first piece (7) having:

i) two flexible lugs (9A, 9B) each structured, in the absence of any force acting thereon, over a predetermined length as measured from a free end thereof, to be inserted without effort into the opening (6) in the support (1), each lug being moveable in the opening into a position of locking on the support (1), ii) a stop (15) for bearing against the support (1) when the predetermined length of said flexible lugs (9A, 9B) have been inserted into the opening (6), and iii) a body (8) to which the flexible lugs (9A, 9B) are connected, said body including a body opening (11) of predetermined contour that opens out between the flexible lugs (9A, 9B); and b) a second piece (30) having:

i) a fixing foot (32) adapted to cooperate with the first piece (7) so that the fixing foot (32) can be inserted, from a free end thereof, through the body opening (11) whereby the article to be fixed (7, 30) is locked into the opening in the support as a result of the fixing foot (32) spreading the flexible lugs (9A, 9B) into a locking position with the support opening, ii) a snapping-in arrangement (45) located on the fixing foot to contact the lugs and thereby hold the second piece (30) on the first piece (7) when the article to be fixed is in the configuration of the locking position on the support, and iii) an element (31) to which the fixing foot (32) is connected by a second end, wherein said element (31) forming part of the second piece (30) is a vehicle sun-visor hook.

9. Vehicle, characterised in that it has a support (1) provided with an opening (6) of predetermined contour, an article (7, 30) according to claim 8, mounted on this support.

* * * * *